United States Patent [19]

Kuhle et al.

[11] 3,869,509

[45] Mar. 4, 1975

[54] N-ALKYL-N(TRIHALOMETHYLTHIO)-SULFAMIC ACID CHLORIDE

[75] Inventors: Engelbert Kühle, Bergisch-Gladbach; Erich Klauke, Odenthal-Hahnenberg, both of Germany

[73] Assignee: Bayer Aktiengesellschaft, Leverkusen, Germany

[22] Filed: Oct. 9, 1970

[21] Appl. No.: 79,669

[30]     Foreign Application Priority Data

Oct. 23, 1969    Germany............................ 1953356

[52] U.S. Cl........... 260/543 R, 260/556 N, 424/321
[51] Int. Cl.................... C07c 143/70, C07c 143/74
[58] Field of Search ................................. 260/543 R

[56]          References Cited
    FOREIGN PATENTS OR APPLICATIONS
1,193,037    2/1966    Germany........................ 260/543 R 881,862    11/1961    Great Britain.................. 260/543 R

OTHER PUBLICATIONS

Senning, Acta Chim. Scand., 1970, 24(1), 221–227, abstract only.

*Primary Examiner*—Lorraine A. Weinberger
*Assistant Examiner*—Richard D. Kelly
*Attorney, Agent, or Firm*—Burgess, Dinklage & Sprung

[57]          ABSTRACT

Reacting a N-alkyl-amidosulfonyl chloride with a sulfenic acid chloride in the presence of an acid binding agent, optionally in the presence of an inert solvent, at a temperature of about 0°–100°C., to form the corresponding N-alkyl-N-(trihalomethylthio)-sulfamic acid chlorides, which are new compounds and which are intermediates for the preparation of fungicides.

4 Claims, No Drawings

N-ALKYL-N(TRIHALOMETHYLTHIO)-SULFAMIC ACID CHLORIDE

The present invention relates to and has for its objects the production of N-alkyl-N-(trihalomethylthio)-sulfamic acid chlorides, which are intermediates for the preparation of fungicidal agents.

It is known that reacting N-alkylamidosulfonyl chlorides with a tertiary base yields N-sulfonylamines which immediately polymerize (cf. Journal of the American Chemical Society, 89th Volume page 2502 (1967)).

The present invention provides N-alkyl-N-(trihalomethylthio)-sulfamic acid chlorides of the formula

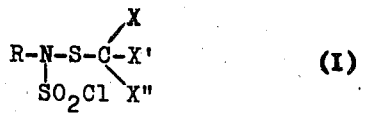

in which:
R stands for alkyl with 1 to 4 carbon atoms, and
X, X' and X'' each individually stands for fluorine or chlorine.

The present invention also provides a process for the production of such a compound in which a N-alkyl-amido-sulfonyl chloride of the formula

in which:
R is the same as defined above
is reacted with a sulfenic acid chloride of the formula

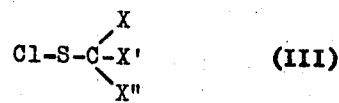

in which:
X, X' and X'' are the same as defined above
in the presence of an acid-binding agent and, optionally, in the presence of an inert solvent.

It is very surprising that, in contrast to the stated reaction known in the literature, the N-alkylamidosulfonyl chlorides with a tertiary amine, with the addition of a sulfenic acid chloride, yield the desired compounds of the formula (I).

The reaction course can, when N-methylamidosulfonyl chloride and fluorodichloromethanesulfenyl chloride are used as starting materials, be represented by the following formula scheme:

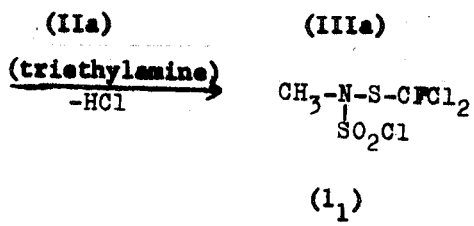

The N-alkylamidosulfonyl chlorides to be used as starting materials are defined by the formula (II). Suitable N-alkylamidosulfonyl chlorides include, for example N-methylamidosulfonyl chloride, N-ethylamidosulfonyl chloride, N-propylamidosulfonyl chloride, N-isopropylamidosulfonyl chloride, N-butylamidosulfonyl chloride, N-isobutylamidosulfonyl chloride and N-sec. butyl amidosulfonyl chloride. The compounds are known (cf. Acta Chem. Scand. 17. 2141 (1963)).

The sulfenic acid chlorides to be used as starting materials are precisely defined by the formula (III). The compounds are generally known. Suitable trihalomethanesulfenic acid chlorides include, for example, trichloromethane-, fluoro-dichloromethane-, difluorochloromethane- and trifluoromethane-sulfenyl chloride.

The inert solvent, which may be a mere diluent, may be an inert organic solvent. These include ethers, such as diethyl ether and dioxane; hydrocarbons, such as benzene; and chlorinated hydrocarbons, such as chloroform and chlorobenzene.

To bind the hydrogen chloride forming in the reaction, a tertiary base, for example triethylamine, N,N-dimethylbenzylamine, or an inorganic base, such as an alkali metal hydroxide or alkali metal carbonate, may be added to the reaction mixture.

The reaction temperatures can be varied within a fairly wide range; in general, the reaction is carried out at about 0° to 100°C., preferably at about 20° to 40°C.

In carrying out the process according to the invention, preferably 1.1 moles of sulfenic acid chloride and 1.1 moles of acid-binding agent are used per mole of N-alkylamidosulfonyl chloride; amounts lesser or greater by up to 20% are possible without substantial diminution of yield. The acid-binding agent forms an insoluble adduct with hydrogen chloride which is filtered off with suction. When the filtrate is fractionally distilled, the end product may be obtained.

The new N-alkyl-N-(trihalomethylthio)-sulfamic acid chlorides according to the invention are valuable intermediates. For example, by the reaction of N-methyl-N-(fluorodichloromethylthio)-sulfamic acid chloride with dimethylamine in benzene at 20° to 40°C, the fungicidally effective N,N-dimethyl-N'-methyl-N'-(fluorodichloromethylthio)-sulfuryldiamide (cf. Angewandte Chemie 76, page 807 et seq. (1964), Table 5) is obtained.

By reaction of the above-mentioned intermediate with N-ethyl-aniline, the likewise fungicidally effective N-ethyl-N-phenyl-N'-methyl-N'-(fluorodichloromethylthio)-sulfuryl diamide is obtained (cf. Deutsche Auslegeschrift (German Published Specification) No. 1,300,726. column 2). Generally speaking, the reaction of the intermediate obtained according to the invention with aliphatic and aromatic amines leads to effective fungicides.

The following Examples are set forth to illustrate, without limitation, the manner of producing the instant compounds in accordance with the process of the present invention.

EXAMPLE 1

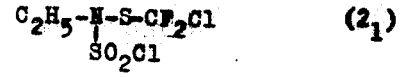

28.6 g (0.20 mole) N-ethylamidosulfonyl chloride and 33 g (0.216 mole) difluorochloromethanesulfenyl chloride are dissolved in 100 ml benzene, and a solution of 22 g (0.22 mole) triethylamine in 50 ml benzene is added dropwise at 10°C. The temperature is allowed to rise to about 40°C; stirring is effected for a time, followed by suction filtration from the precipitated triethylamine hydrochloride. The filtrate is concentrated in a vacuum and the residue is subsequently fractionally distilled. 25 g (0.096 mole) N-ethyl-N-(difluorochlormethylthio)-sulfamic acid chloride of b.p. 60°–62°C/0.3 mm Hg are obtained. In addition, 12 g (0.083 mole) of unreacted N-ethylamidosulfonyl chloride of b.p. 90°–92°C/0.3 mm Hg are recovered.

EXAMPLE 2

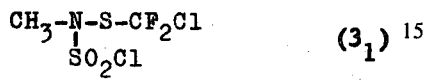 (3$_1$)

The compound, starting from 0.2 mole N-methylamidosulfonyl chloride, is prepared in manner corresponding to Example 1. N-methyl-N-(difluorochloromethylthio)-sulfamic acid chloride of b.p. 88°–90°C/2 4 mm Hg is obtained.

Example 3

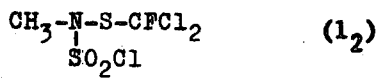 (1$_2$)

The compound is prepared by a method analogous to that of Example 2, except that fluorodichloromethanesulfenyl chloride is reacted with N-methylamidosulfonyl chloride. N-methyl-N-(fluorodichloromethylthio)-sulfamic acid chloride of b.p. 65°–67°C/0.03 mm Hg is obtained.

The following example illustrates the method of utilizing the intermediate compound to form the fungicidally active final product.

EXAMPLE 4

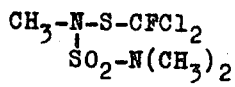

By reaction of 1 mole of the N-methyl-N-(fluorodichloro-methylthio)-sulfamic acid chloride (obtained according to the above Example 3) with 2 moles of diethylamine in benzene as solvent, there is obtained, at a working temperature of 20°–40°C, N,N-dimethyl-N'-methyl-N'-(fluorodichloromethylthio)-sulfuryl-diamide, the fungicidal effectiveness of which is known (cf. Angewandte Chemie 76, 812 (1964), ibidem compound (24) in Table 5).

It will be appreciated that the instant specification and examples are set forth by way of illustration and not limitation, and that various modifications and changes may be made without departing from the spirit and scope of the present invention.

What is claimed is:

1. N-alkyl-N-(trihalomethylthio)-sulfamic acid chloride of the formula:

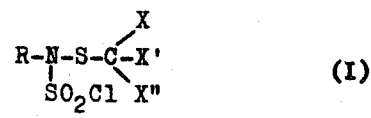 (I)

in which:

R is alkyl with 1-4 carbon atoms, and

X, X' and X'' each individually stand for fluorine or chlorine.

2. Compound according to claim 1 wherein such compound is N-methyl-N-(fluorodichloromethylthio)-sulfamic acid chloride of the formula

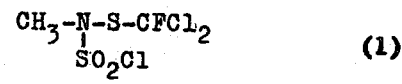 (1)

3. Compound according to claim 1 wherein such compound is N-ethyl-N-(difluorochlormethylthio)-sulfamic acid chloride of the formula

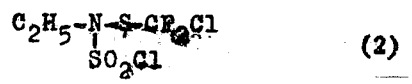 (2)

4. Compound according to claim 1 wherein such compound is N-methyl-N-(difluorochloromethylthio)-sulfamic acid chloride of the formula

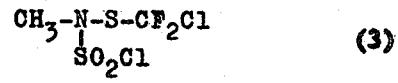 (3)

* * * * *